United States Patent [19]
Nagata et al.

[11] Patent Number: 5,291,781
[45] Date of Patent: Mar. 8, 1994

[54] DIAPHRAGM-TYPE SENSOR

[75] Inventors: Mitsuhiko Nagata, Fujisawa; Shoji Kamiunten; Takashi Kurosawa, both of Chigasaki; Tomoshige Yamamoto, Sagamihara, all of Japan

[73] Assignee: Yamatake-Honeywell Co., Ltd., Japan

[21] Appl. No.: 59,890

[22] Filed: May 10, 1993

Related U.S. Application Data

[63] Continuation of Ser. No. 685,077, Apr. 12, 1991, abandoned.

[51] Int. Cl.$^5$ .............................................. G01F 1/68
[52] U.S. Cl. ................................. 73/204.26; 73/204.11
[58] Field of Search ............... 73/204.16, 204.24, 23.4, 73/204.26

[56] References Cited

U.S. PATENT DOCUMENTS

| | | | |
|---|---|---|---|
| 4,471,647 | 9/1984 | Jerman et al. | |
| 4,501,144 | 2/1985 | Higashi et al. | 73/204.26 |
| 4,542,650 | 9/1985 | Renken et al. | 73/204.26 |
| 5,050,429 | 9/1991 | Nishimoto et al. | 73/204.26 |

Primary Examiner—Herbert Goldstein
Assistant Examiner—R. L. Biegel
Attorney, Agent, or Firm—Whitham & Marhoefer

[57] ABSTRACT

A diaphragm-type sensor is disclosed which comprises a substrate including a cavity, a diaphragm formed on the cavity and supported by the substrate, a heater element arranged on the diaphragm, two sensor elements arranged on both sides of the heater means and slits between the heater means and the respective sensor means. The slits are effective in completely preventing the deformation of the diaphragm due to a heat propagated from the heater element, from influencing the sensor elements, whereby the diaphragm-type sensor exhibits stable output characteristics.

3 Claims, 5 Drawing Sheets

DIAPHRAGM-TYPE SENSOR

This is a continuation of application Ser. No. 07/685,077, filed Apr. 12, 1991; now abandoned.

BACKGROUND OF THE INVENTION

1. Field of the Invention

This invention relates to a diaphragm-type sensor for use in a flow detecting apparatus.

2. Description of the Prior Art

FIG. 1 is a perspective view of a conventional flow sensor of a type known as a microbridge flow sensor. The flow sensor as illustrated comprises a semiconductor substrate 1 made, for example, of silicon which is formed with a cavity 4 at a central portion thereof communicating openings 2, 3 at both side portions. A bridge 5 is formed over the cavity 4 so as to be thermally insulated from the semiconductor substrate 1. The bridge 5 includes a thin-film heater element 7 and two thin-film thermally sensitive resistor elements 8, 9 aligned on both sides of the heater element 7, the three elements being formed by a known thin-film forming technique. The semiconductor substrate 1 further comprises another thin-film thermally sensitive resistor element 10 formed at a corner portion thereof. A slit-like central opening 11 is also formed in addition to the side openings 2, 3 such that portions exposed by these openings 2, 3 and 11 are etched by an anisotropic etchant such as KOH to form the cavity 4 in an inverted trapezoidal shape as well as the bridge 5 supported by the semiconductor substrate 1, wherein the heater element 7 and the thermal sensor elements 8, 9 are thermally insulated from the semiconductor substrate 1 by the cavity 4. The elements 7, 8 and 9 are further encapsulated by a protective layer (6 in FIG. 2) made of a material having a low thermal conductivity ratio such as silicon nitride.

FIGS. 2a and 2b shows the operation of the microbridge flow sensor shown in FIG. 1. FIG. 2a illustrates a temperature distribution of the respective elements 7, 8 and 9 while FIG. 2b a cross-sectional view of the sensor taken along a line B—B' of FIG. 1.

If the heater element 7 is controlled to remain at a constant temperature higher than an ambient temperature, for example 63° C., the thermal sensor element 8, 9 exhibit a substantially equal temperature as shown in FIG. 2a, for example, 35° C. In this circumstance, if a fluid flows in the direction indicated by an arrow 12 shown in FIG. 1, the upstream sensor element 8 is cooled down by a temperature $\Delta T_3$ while the downstream sensor element 9 is heated by $\Delta T_4$. Consequently, a temperature difference is produced between the upstream sensor element 8 and the downstream sensor element 9. Thus, the microbridge flow sensor is used for detecting flow rates by incorporating the thermal sensor elements 8, 9 in a Wheatstone bridge to convert the temperature difference to a voltage signal corresponding to a flow rate of a fluid under measurement.

The microbridge flow sensor, as mentioned above, has a thin film bridge structure with an extremely small thermal capacitance formed by the thin film technique and the anisotropic etching technique and is advantageous in a very high response speed, a high sensitivity, a low power consumption, a good adaptability to a mass production, and so on.

However, the conventional microbridge flow sensor includes relatively large openings 2, 3 on both sides which are necessarily formed for etching semiconductor substrate 1 to form the cavity 4. The large openings 2, 3 causes a fluid flow to go into the cavity 4, whereby dust in the fluid may be attached in vicinity of the openings or in cavity 4 to badly affects the sensor characteristics.

OBJECTS AND SUMMARY OF THE INVENTION

In view of the above-mentioned problem, it is an object of the invention to provide a diaphragm-type sensor having a diaphragm structure in place of a bridge structure which is capable of avoiding attachment of dust in a fluid on the sensor.

It is another object of the invention to provide a diaphragm-type sensor which is capable of preventing the influence of a deformation of a diaphragm due to heat from exerting the output characteristics of the sensor.

To achieve the above objects, the invention provides a diaphragm-type sensor comprising:

a substrate including a cavity;

a diaphragm formed on the cavity and supported by the substrate;

heater means arranged on the diaphragm;

two sensor means arranged on both sides of the heater means; and slits between the heater means and the respective sensor means.

The above and other objects and features of the present invention will become apparent from the following detailed description of the preferred embodiments with reference to the accompanying drawings.

DETAILED DESCRIPTION OF THE PREFERRED EMBODIMENTS

Figure 1:
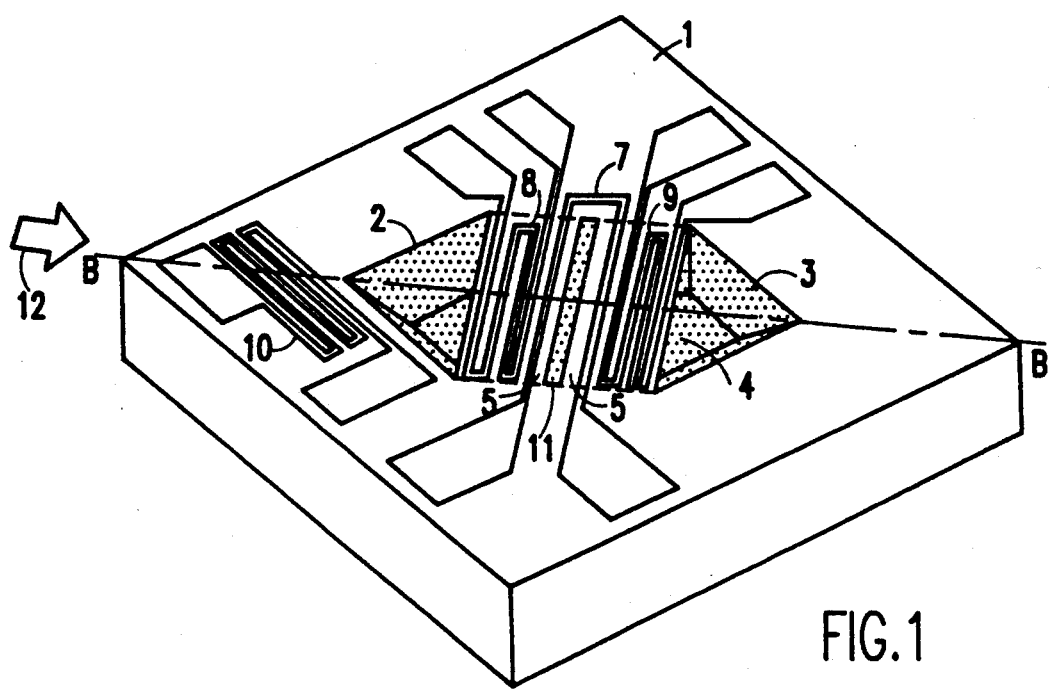
FIG. 1 is a perspective view showing a conventional microbridge flow sensor.
Figure 2A:
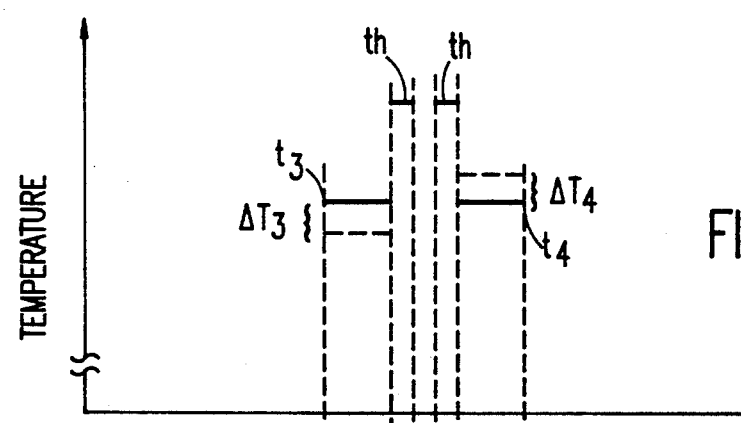
FIGS. 2a and 2b are diagrams used for explaining the operation of the conventional microbridge flow sensor shown in FIG. 1.
Figure 2B:
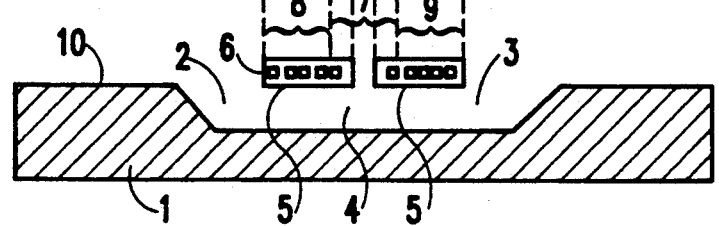
Figure 3A:
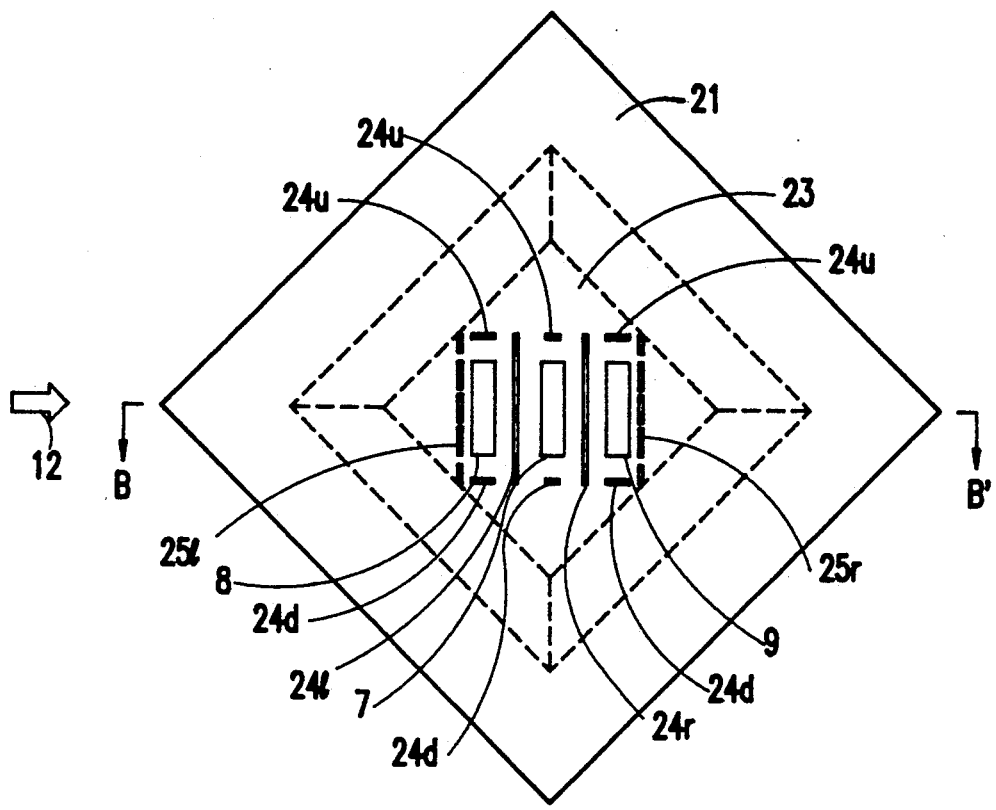
FIG. 3a is a plan view showing a main portion of a first embodiment of a diaphragm-type sensor.
Figure 3B:
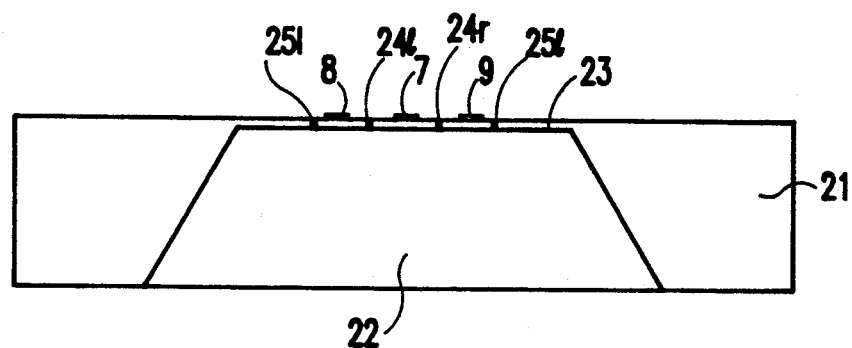
FIG. 3b is a cross-sectional view of the diaphragm-type sensor shown in FIG. 3a taken along a line B—B'.

FIGS. 3a and 3b respectively show a plan view and a cross-sectional view of a first embodiment of a diaphragm-type sensor. A semiconductor substrate 21 made, for example, of silicon is formed on the rear surface thereof with a cavity 22 in an inverted trapezoidal shape, for example, by an anisotropic etching to an extent that the cavity 22 does not reach the main surface of the semiconductor substrate 21. Thereby, a thin diaphragm 23 is formed, integral with the semiconductor substrate 21, on the main surface thereof. On a central portion of the surface of a diaphragm 23 there are formed a heater element 7 and thin film thermal sensitive resistor elements 8, 9 on the both sides of the heater element 7 which are parallelly aligned with a substantially equal space therebetween. The heater element 7 and the sensor elements 8, 9 are surrounded by a multiplicity of slits as shown in FIG. 3a. More specifically, a group of rectangular slits 25r are formed on the right of the element 9, elongated slits 24r and 24l between the elements 7 and 9 and between the elements 7 and 8, respectively, a group of rectangular slits 25l on the left side of the element 8, and two other groups of slots 24u and 24d above and below the elements 7-9, respectively.

Figure 4A:
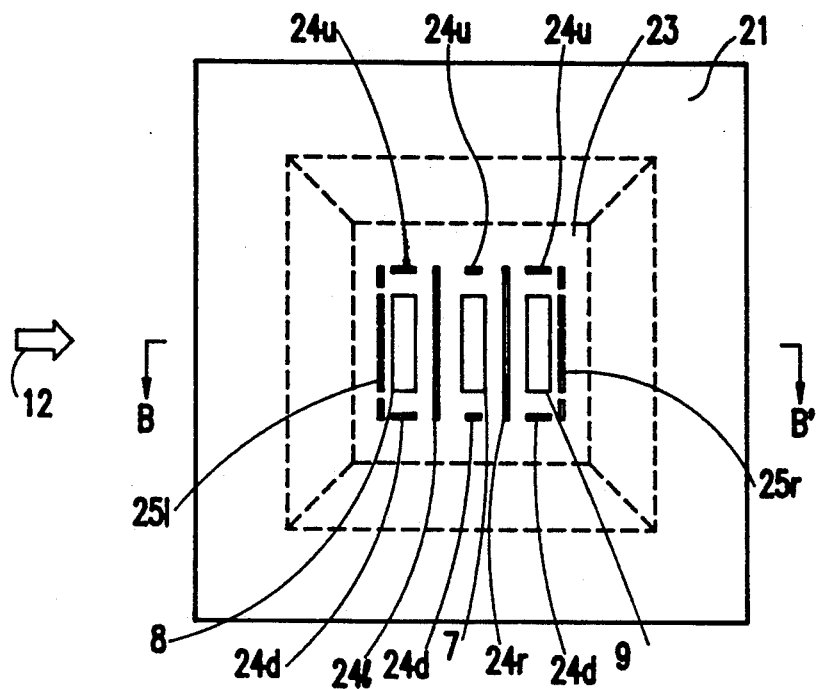
FIG. 4a is a plan view showing a main portion of a second embodiment of a diaphragm sensor.
Figure 4B:
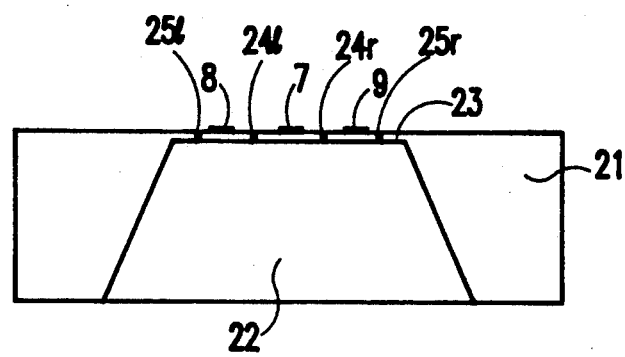
FIG. 4b is a cross-sectional view of the diaphragm sensor shown in FIG. 4a taken along a line B—B'.

FIGS. 4a and 4b respectively show a plan view and a cross-sectional view of a second embodiment of a diaphragm-type sensor. The second embodiment differs from the first embodiment in that the sensor is oriented such that a fluid flow passes the sensor perpendicularly to the lateral sides of the sensor. Such an orientation allows a smooth flow through the sensor.

The above structure including the two sensor elements 8, 9 on both sides of the heater element 7 permits a detection of zero flow by monitoring a balance condition of the sensor elements 8, 9 with respect to a fluid flow from a direction indicated by an arrow 12 or the reverse direction, thereby making it possible to set a stable zero point. This feature further leads to enable a measurement of a low rate flow in a high accuracy. The elongated slits 24l, 24r formed on the both sides of the heater element 7 effectively prevent a heat conduction from the heater element 7 to the sensor elements 8, 9 through the diaphragm 23, whereby the sensor elements 8, 9 are not influenced by the heat generated by the nearby heater element 7. It is therefore possible to reduce output errors due to attachment of dust on the sensor which becomes larger in proportion to temperatures at the sensor elements 8, 9 and output errors due to drifts caused by a difference in the thermal conductivity ratio between the upper and lower elements 8, 9 which also becomes larger in proportion to temperatures at the sensor elements 8, 9. Further, since the heat from the heater element 7, which may act to decrease the difference in temperature between the upstream and downstream sensor elements 8 and 9, is effectively insulated by the slot groups formed around the elements 7, 8, 9, the sensitivity of the sensor is improved also in a low flow rate region.

In the first and second embodiments, the heater element 7, when supplied with an electric power to be heated, suffers a thermal deformation, however, the influence of such a deformation is prevented from exerting on sensor elements 8, 9 by slits 24l, 24r. This remarkable effect will be explained in detail with reference to FIGS. 5a, 5b.

Figure 5A:
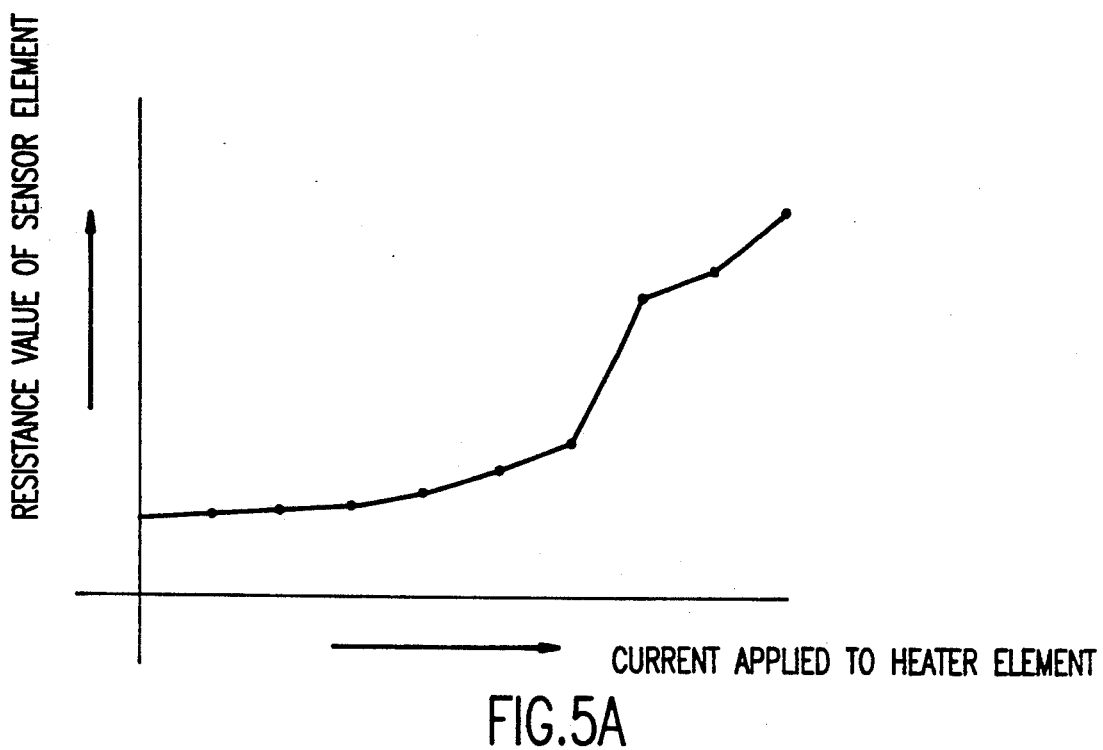
FIGS. 5a, 5b are graphs showing the relationship between an applied current to a heater element and an output from a sensor element.
Figure 5B:
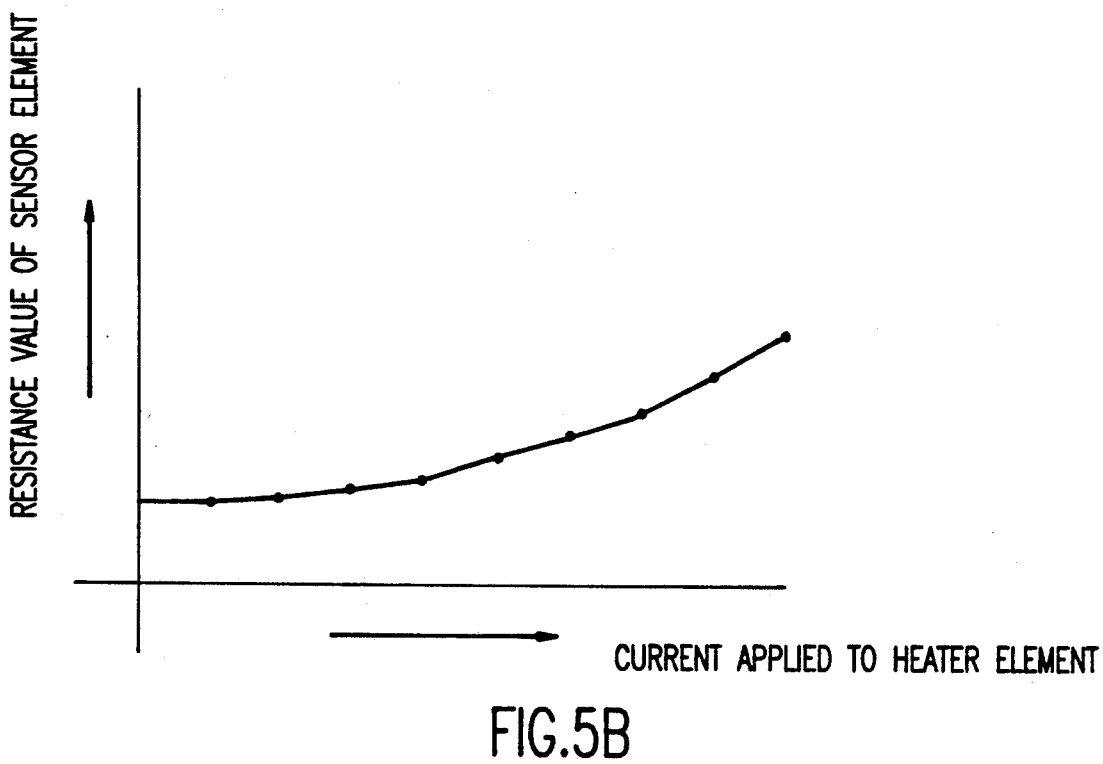

FIG. 5a indicates a change in the resistance value of the sensor elements of the diaphragm sensor which does not have slots between the heater element and the respective sensor elements as a current supplied to the heater element is being increased, while FIG. 5b indicates the same change of the diaphragm sensor which has the heater element and the sensor elements respectively separated by slots 24l and 24r under the same condition. An increase of a heater current causes a mechanical deformation of the diaphragm 23 due to propagation of heat generated in the heater element to the diaphragm 23. In the diaphragm sensor which is not provided with slots between the heater element and the respective sensor elements, the deformation of the diaphragm 23 is also propagated to the sensor elements 8, 9 and also causes distortion of the sensor elements 8, 9, when such mechanical deforming force exceeds a certain limit value, which results in an error in the resistance value of the sensor elements 8, 9, as shown in FIG. 5a. The position of this limit value may vary according to conditions. Further, the two sensor elements 8, 9 are not equally influenced by such force and accordingly the balance therebetween is quite instable. Actually, a necessary current for obtaining a sufficient sensitivity often exceeds the limit value. Particularly, in a use where the sensor is intermittently driven by an intermittently supplied current exceeding the limit value, the characteristics of the sensor elements vary each time the current is supplied, which results in degrading the measuring accuracy.

On the contrary, the diaphragm sensor having the slits 24l, 24r completely prevents the deformation of the diaphragm 23 from influencing the sensor elements 8, 9, whereby the sensor exhibits stable output characteristics as shown in FIG. 5b.

Figure 6A:
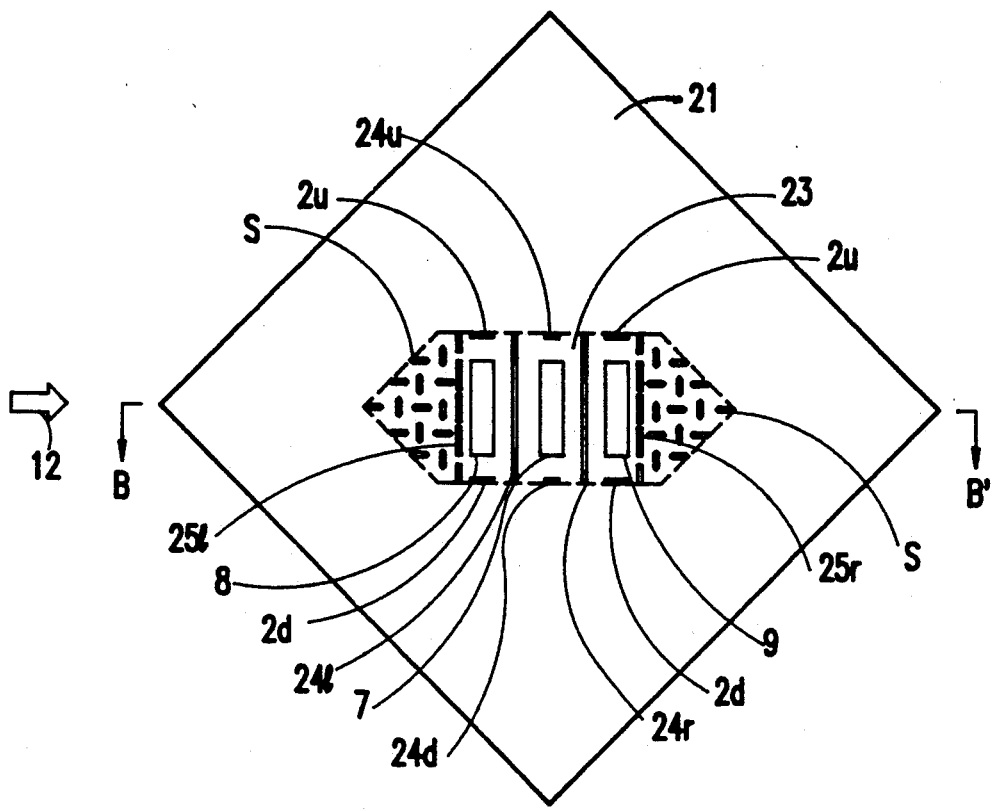
FIGS. 6a, 6b are diagrams used for explaining a method of forming a cavity in a semiconductor substrate.
Figure 6B:
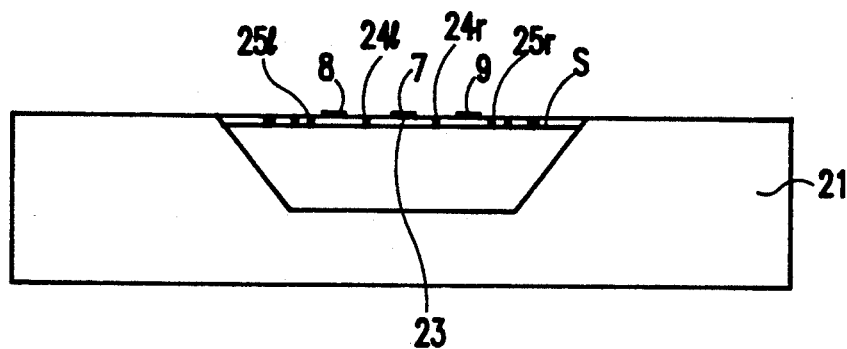

In the above-mentioned embodiments, the cavity 22 is formed by etching the semiconductor substrate 21 from the lower surface thereof, however, as shown in FIG. 6a, a multiplicity of slots S may be provided to etch the semiconductor substrate 21 by anisotropic or isotopic etching making use of the etching characteristic of the crystal axis, to form a cavity beneath the diaphragm 23.

Also, the semiconductor substrate 21 is not limited that made of silicon, and a metal substrate made, for example, of aluminum or stainless may be used as the semiconductor substrate 21. In this case, the diaphragm may be formed of an insulating layer such as $SiO_2$, $Si_3N_4$.

The diaphragm may be formed by several methods other than etching as mentioned above such as a laser machining. It is also possible to separately make a substrate and a diaphragm and adhere the diaphragm on the substrate.

Since many changes could be made in the above construction and many apparently widely differing embodiments of the present invention could be made without departing from the scope thereof, it is intended that all matter contained in the above description or shown in the accompanying drawings shall be interpreted as illustrative and not in a limiting sense.

What is claimed is:

1. A flow sensor for detecting a fluid flow comprising in combination:
    a substrate with a cavity formed therein having a peripheral edge at one surface of said substrate;
    a thin diaphragm completely covering said cavity by extending in all directions to said peripheral edge, said diaphragm being supported by said substrate and sealing said cavity from intrusion by dust particles borne by said fluid flow;
    a heater formed on said diaphragm;
    a first sensor formed on said diaphragm on one side of said heater and a second sensor formed on said diaphragm on another side of said heater; and
    a first slit formed in said diaphragm between said first sensor and said heater, said first slit being sufficiently narrow that it blocks entry of said dust particles; and
    a second slit formed in said diaphragm between said second sensor and said heater, said second slit being sufficiently narrow that it blocks entry of said dust particles.

2. As in claim 1, wherein said substrate is a silicon semiconductor substrate and said cavity is formed by anisotropic etching through said narrow slits.

3. A flow sensor for detecting a fluid flow as in claim 2, wherein said diaphragm is formed integrally with said substrate.

* * * * *